Feb. 11, 1941.   F. J. BINGLEY   2,231,792
SYNCHRONIZING SYSTEM AND METHOD
Filed Aug. 12, 1938   7 Sheets-Sheet 1

Inventor:-
Frank J. Bingley
By his Attorneys
Howson & Howson

Feb. 11, 1941.  F. J. BINGLEY  2,231,792
SYNCHRONIZING SYSTEM AND METHOD
Filed Aug. 12, 1938  7 Sheets-Sheet 2
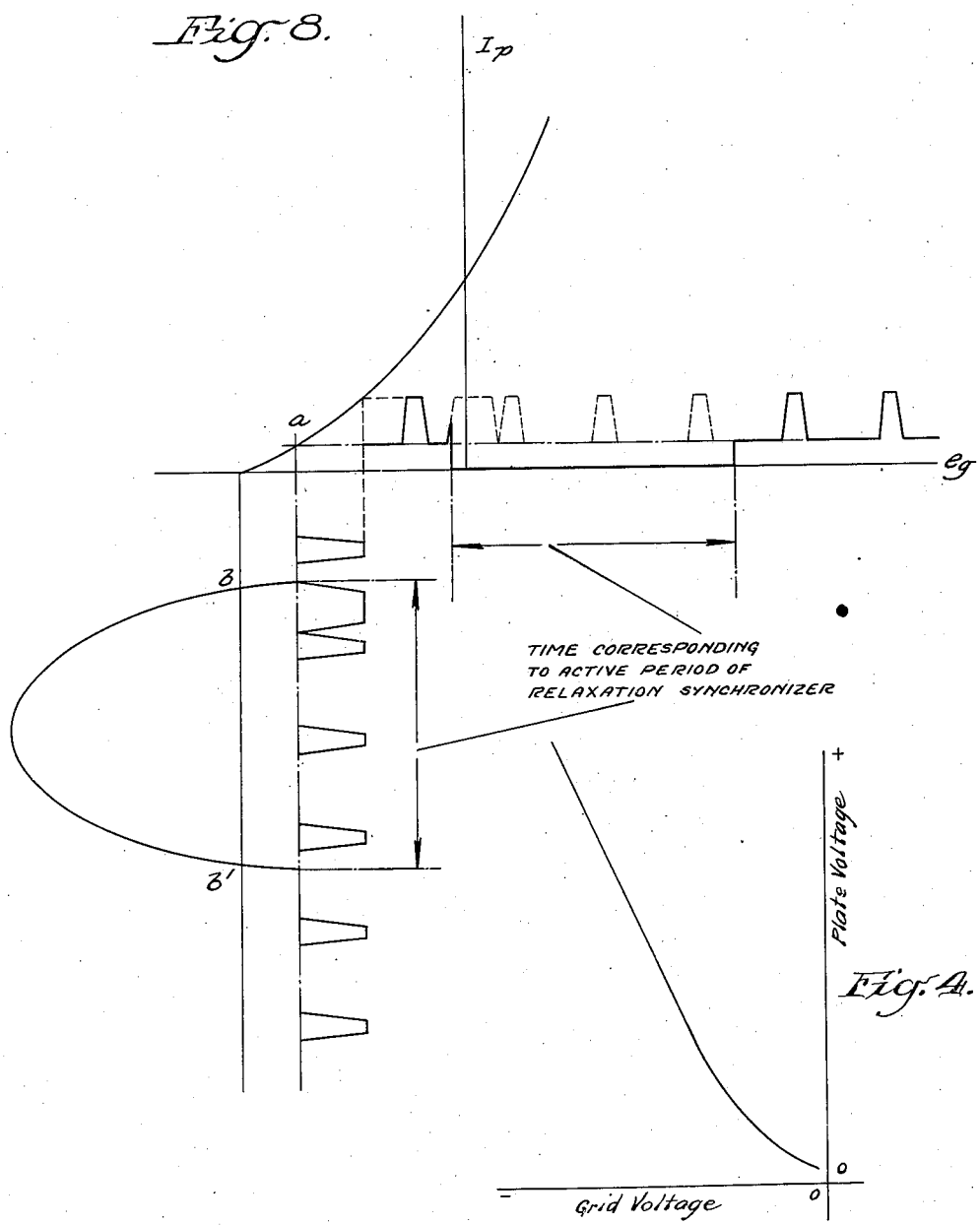
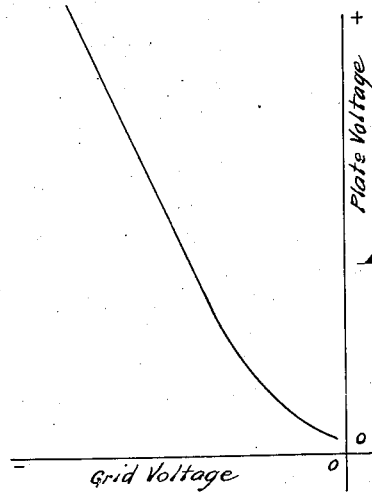

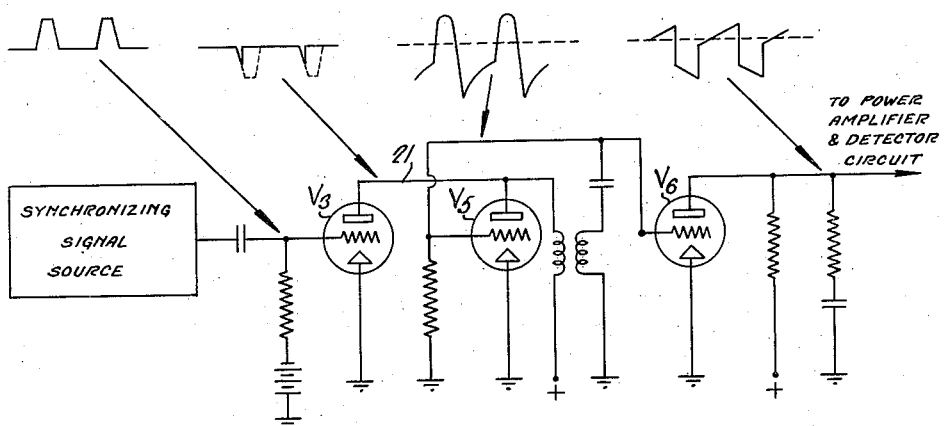
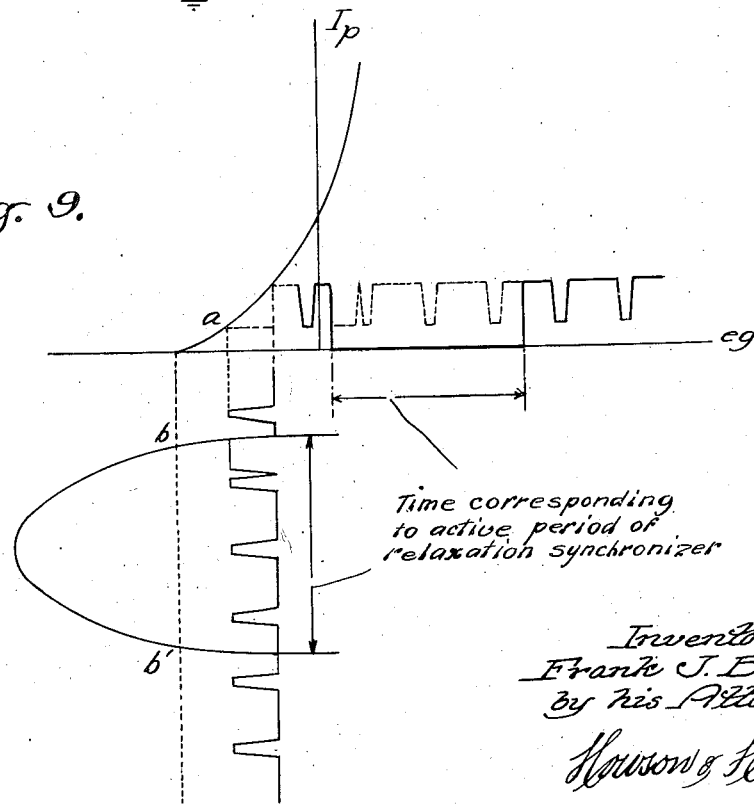

Feb. 11, 1941.   F. J. BINGLEY   2,231,792
SYNCHRONIZING SYSTEM AND METHOD
Filed Aug. 12, 1938   7 Sheets-Sheet 6

Inventor:-
Frank J. Bingley
by his Attorney
Howson & Howson

Patented Feb. 11, 1941

2,231,792

UNITED STATES PATENT OFFICE 2,231,792

SYNCHRONIZING SYSTEM AND METHOD

Frank J. Bingley, Mount Airy, Pa., assignor by mesne assignments, to Philco Radio and Television Corporation, Philadelphia, Pa., a corporation of Delaware Application August 12, 1938, Serial No. 224,646

22 Claims. (Cl. 178—69.5)

This invention relates to improvements in synchronizing circuits and in particular to those forms of synchronizing circuits which employ a self-oscillatory device capable of synchronization by a pulse signal supplied thereto. Such systems are commonly used in controlling the deflecting systems of television receivers and the application of the invention to such circuits will be particularly pointed out in this specification. It will, however, be realized that the invention is not restricted to use in television synchronizing circuits but that many other applications are conceivable within the scope of the invention.

In modern television practice, the image is obtained by varying the intensity of an electron beam which simultaneously is caused to sweep across the receiving screen in successive lines. "Interlaced" scanning is employed to minimize flicker which would otherwise be objectionable due to the low image repetition rate. By this method adjacent lines are not scanned consecutively but instead alternate lines are scanned to produce half of the picture and another scanning supplies the missing portion not included in the first scanning. In order to obtain the proper deflecting voltages to produce this sort of scanning, synchronizing signals must be supplied in which the vertical synchronizing pulses are not always displaced in time by the same amount from adjacent horizontal pulses. In practice this usually means that one vertical pulse will start immediately before a horizontal pulse and the next one immediately after a horizontal pulse, the duration of a vertical pulse being shorter than the time interval between successive horizontal pulses. In the usual type of synchronizing circuit employing an oscillator of the type above-mentioned, this variation in the time relation between synchronizing pulses causes a phenomenon which is known as "pairing" to occur in the reproduced picture. This manifests itself as a non-uniformity in the spacing between adjacent lines and its cause will be made clear as the description proceeds. Fundamentally it is due to non-uniformity in the size and shape of the vertical deflecting signal which may result from the above-mentioned inconstancy in the time relation between vertical and horizontal synchronizing pulses and/or from noise pulses introduced into the synchronizing system along with the desired signal.

It is the principal object of the invention to overcome this defect of the synchronizing system. In general, the method of the invention involves the use of an oscillatory synchronizing circuit of conventional type in which each synchronizing pulse serves to initiate the cycle of the oscillator, the constants of which are so adjusted that its natural period is somewhat longer than the spacing of the synchronizing pulses. The output of the oscillator is supplied to a suitable wave shaping circuit, usually known as a "discharge" circuit, from which suitable signals are obtained to energize the electron beam deflecting means. The usual form of the oscillator is the "blocking tube" or relaxation type, the operation of which will later be explained. Such oscillators are characterized by certain defects which produce the objectionable effects abovementioned. The present invention overcomes these defects, as will be described in detail later.

A further objective is to provide a more satisfactory means for separating horizontal and vertical synchronizing pulses one from the other so that they may be applied to their respective circuits free from any residual signal. It is customary to transmit both synchronizing pulses as additions to the video signal which manifest themselves as increases in amplitude above, or decreases in amplitude below, a predetermined carrier level which is termed the blanking level. The composite synchronizing signal, comprising both horizontal and vertical pulses, is removed by amplitude selection. In separating the horizontal from the vertical synchronizing pulses numerous methods have been employed. In one well known system, the horizontal pulses have an amplitude different from that of the vertical pulses, and one signal may therefore be separated by amplitude selection and obtained substantially free from any vestige of the other. In order to separate out the pulse of lesser amplitude, however, it is necessary to employ frequency discriminating means. Such means are not entirely successful in providing the pulses of lesser amplitude free from any residual component of the other and larger pulses. By the present invention, it is possible to achieve the separation of synchronizing pulses without resorting to either of the above mentioned methods (i. e. amplitude selection or frequency selection) and in a manner which is not subject to their defects. Furthermore, it is not necessary, in practicing the invention, to use horizontal and vertical synchronizing pulses of different amplitude.

In describing the invention, reference will be had to the accompanying drawings in which:

Fig. 4 is a representation of the operating characteristic of a grid-controlled gas discharge tube;

Figs. 7 to 9 illustrate graphically the method and mode of operation of the invention; and Figs. 10 to 15 illustrate various further specific embodiments of the invention.

Figure 1:
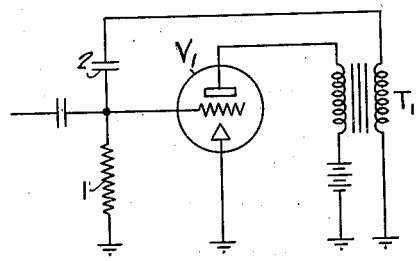
Fig. 1 is a circuit diagram of the "blocking tube" oscillator.

In order that the mode of operatiton of the invention may be thoroughly understood, it is deemed advisable to discuss first in detail the principal oscillatory circuits of the type with which the invention is designed to be used. The "blocking tube" oscillator shown in Fig. 1 is characteristic of such devices and will be described first. Such a device is simply an extremely overcoupled regenerative oscillator. In its quiescent condition, the grid of the tube $V_1$ is biased beyond cut-off by a voltage in the time circuit comprising the resistor 1 and the condenser 2. This voltage will gradually leak off until the grid voltage is such that the tube is no longer blocked, at which time the plate will start to draw current. The increase in the plate current will induce a voltage in the grid circuit by means of the transformer $T_1$ which will cause the plate to draw more current. As a result, the plate current and grid voltage will increase rapidly until saturation of the tube occurs. A voltage will be set up across the resistance 1 due to the rectifying action of the grid when it goes positive with respect to its cathode, and this voltage will oppose that occurring in the transformer $T_1$ due to the now lessened positive rate of change of the plate current, and the decrease in space current will induce a further voltage in the grid circuit which will further reduce the grid potential. The plate current will rapidly reduce to zero, after which the only remaining voltage in the grid circuit is that built up across the resistance 1 by the rectifying action of the grid. This voltage is negative with respect to the cathode and sufficiently large to bias the grid beyond cut-off. The tube will remain blocked until this voltage, which is determined by the charge on the condenser and the grid leak, has been reduced sufficiently by leakage to allow the plate again to draw current.

Figure 2:
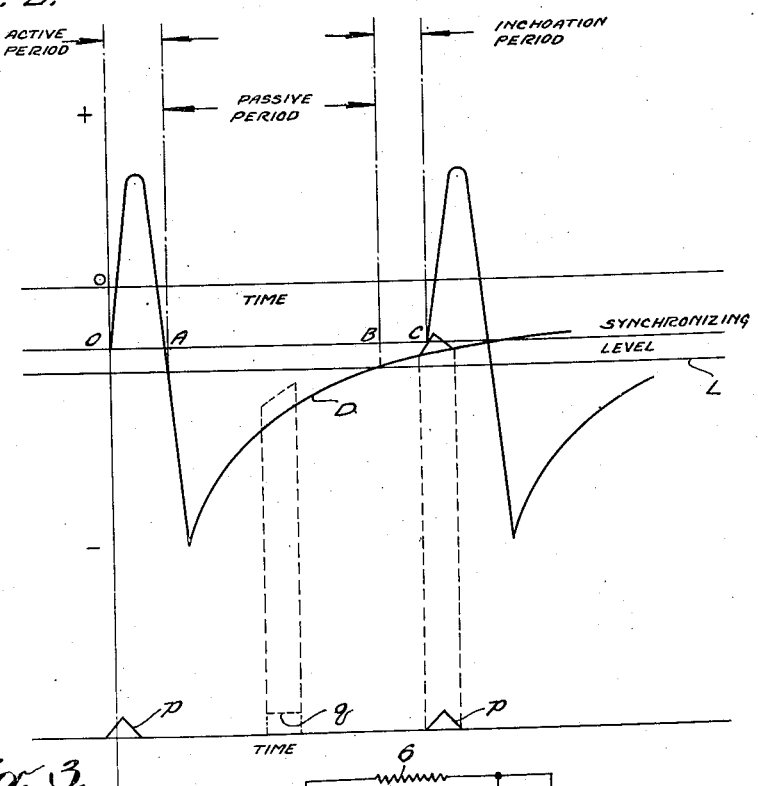
Fig. 2 is a diagram showing the mode of operation of the "blocking tube" oscillator.

It will be seen from Fig. 2, in which the grid voltage of the blocking tube is plotted against time, that when most of the charge has leaked off the grid condenser through the grid leak, the rate of decay is small and the tube may be made to repeat its cycle by applying in the grid circuit a voltage sufficient to cause the grid to become positive with respect to the cut-off point. The period of the oscillator is therefore a function of the values assigned to the resistor 1 and the condenser 2, and also of the magnitude and frequency of occurrence of the signals impressed upon the grid circuit. The magnitude of signal which must be applied to the grid circuit at any time during the decay of the grid circuit voltage determines the "synchronizing level" of the device.

When the "blocking tube" oscillator is running free and is not subject to synchronization by signals applied to it from an external source, the current in the plate circuit will consist of a relatively short impulse and will then be equal to zero for the rest of the cycle. When such oscillators were first used, it was thought that the size and form of this pulse would be substantially independent of any signal of reasonable magnitude applied to the grid. I have found, however, that this is not the case. When the oscillator is used in a television vertical synchronizing circuit, the size of the generated pulse is influenced by the horizontal synchronizing pulses and other extraneous voltages applied to the tube during the active period. Such extraneous voltages drive the grid further positive and cause increased rectification by the grid. This in turn affects the deflecting voltage generator in such a manner as to cause pairing of the lines in the reproduced picture as has already been described. It is this effect upon the size of the pulses generated by the "blocking tube" oscillator caused by extraneous signals applied to the device during its active period that the present invention is specifically designed to prevent.

The "blocking tube" oscillator is typical of a broad class of devices which are characterized by having three rather definite phases in their cycle of operations. The nature of these three phases will be readily recognized by referring to Fig. 2. The first, which is termed the "active period," corresponds in the case of the blocking tube oscillator to the time during which plate current flows with comparative independence of any signal applied to the grid of the tube. This period is initiated when the tube is fired by an incoming synchronizing pulse and continues until the tube blocks itself in the manner hereinbefore described and corresponds in the diagram to that portion of the cycle along the time axis between the origin and the point A. The second period is termed the "passive period" and extends from the time the tube is blocked until it is again capable of being fired by an incoming synchronizing pulse of normal amplitude. Since in practice the pulses fed to the synchronizing circuits will all be of substantially the same size and will occur with constant frequency, the length of this period will be definitely determined. Referring to Fig. 2, the synchronizing level of the tube has been represented by a line parallel to the time axis. As has already been explained, the device will be fired whenever the grid voltage rises to this level. A line L drawn parallel to the synchronizing level line and spaced below it by a distance corresponding to the amplitude of the synchronizing pulse $p$ will intersect the line D representing the decay of the voltage across the grid leak as a point B which defines the end of this period. It will readily be seen that the device is capable of being fired by any pulse equal to or greater in magnitude than a normal synchronizing pulse. If, then, the synchronizing pulses $p$ occur in the manner shown along the lower axis in the figure, the active period will begin at the time C when the voltage which would normally appear at the grid of the tube is augmented by a synchronizing signal introduced in any manner and thereby becomes greater than the synchronizing level. The period during which the device is thus capable of being "fired" is termed the "inchoation period." It will also be noted that it is not capable of being fired at any time during the passive period by a signal of synchronizing pulse amplitude, such, for example, as the pulse designated as $q$ which might represent either a noise pulse or an undesired synchronizing pulse.

Figure 3:
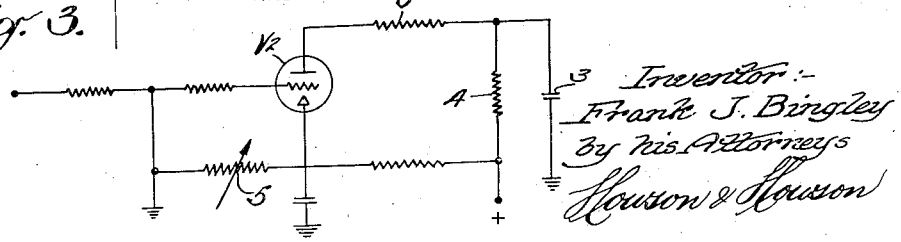
Fig. 3 is a circuit diagram of an oscillator employing a grid-controlled gas discharge tube.
Figure 5:
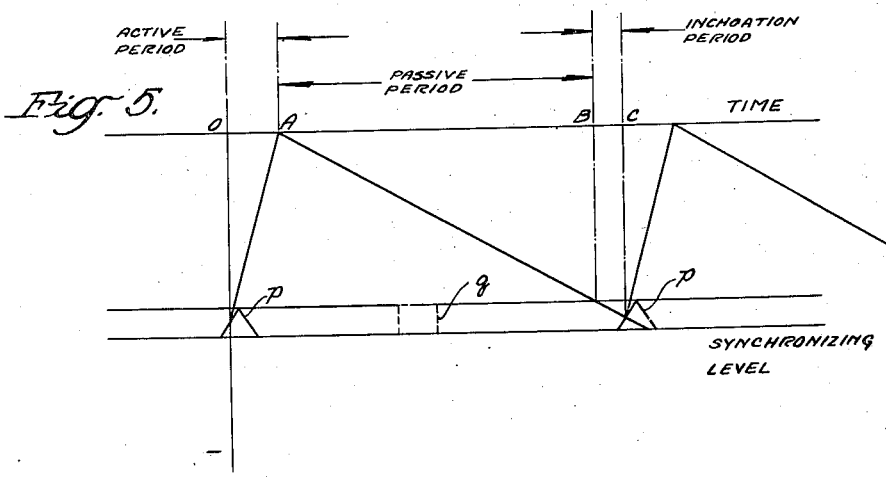
Fig. 5 is a diagram showing the mode of operation of an oscillator employing a grid-controlled gas discharge tube.

Another example of a device characterized by the above-described cycle is illustrated in Fig. 3. Such a device not only performs the function of the oscillatory pulse generator, but also generates the deflecting voltage. Referring to Fig. 3, the device employs a grid-controlled gas discharge tube $V_2$ which generates a "sawtooth" wave form, such as that shown in Fig. 5. As is well known, grid-controlled gas discharge tubes have a firing characteristic of the type shown in Fig. 4.

For a particular value of plate voltage, there is a definite value of grid voltage which must be applied in order to fire the tube and vice versa. If the plate voltage is increased, the grid voltage necessary to fire the tube will be less. In the oscillator shown in Fig. 3, the circuit is so arranged that a voltage is built up on the plate of the tube $V_2$ by charging the condenser 3 through the resistance 4. With a given bias upon the grid of the tube, determined by the resistor 5, it will fire after the plate voltage has reached a definite value. Further, it may readily be seen that for a particular instant in the cycle of the device there is a certain definite value of voltage which must be impressed upon the grid in order to "fire" the tube. The necessary voltage at various times throughout the cycle determines the sawtooth waveform shown in Fig. 5. It will be recognized that there is, as in the case of the "blocking tube" oscillator, a level designated as the synchronizing level at which the active period will begin without the application of any additional signal to the grid. Furthermore, it is possible to determine the point at which the inchoation period begins by constructing a line parallel to the line of synchronizing pulses as in the case of the "blocking tube" oscillator. When the tube fires, the condenser is discharged through it until the plate voltage has fallen to such an extent that the gas in the tube becomes de-ionized. The time required for the condenser to discharge is determined by the magnitude of the resistance 6 in the plate circuit. When the tube ceases to conduct, the condenser is again charged through the resistance and the cycle repeats. It will be seen that the cycle of this particular oscillator may likewise be decomposed into the same three periods aforementioned. The active period corresponds to the period OA during which the tube is conducting, the passive period to the time AB during which it is non-conducting, and also incapable of being fired by a signal of synchronizing pulse amplitude, such as that designated in the figure as $q$, and the inchoation period to the time BC during which the tube may be fired by a signal of synchronization pulse amplitude or greater, such pulses being designated in the figure as $p$.

The above analysis of prior devices of the class described will facilitate an explanation of the present invention. It will be understood that the fundamental purpose of these prior devices is to generate similar pulses of relatively large energy content in response to time spaced synchronizing pulses of comparatively small energy content. In order that the operation of the deflecting voltage generator may be satisfactory, it is necessary that these generated pulses be all of the same size and wave form. This is only possible if no extraneous voltages are added to the pulses generated by the oscillator, such as might be transmitted by the previous stages through the oscillator. The oscillator has the desired capability of preventing the passage of any such extraneous signals of reasonable amplitude during its passive period and this property has been used to advantage in earlier systems. During its active period, however, the oscillator is capable of transmitting such disturbing signals and I have found that the modification thereby of the deflecting voltage wave form is of such a nature as to cause "pairing" of the lines in the reproduced image. My invention is directed to the elimination of this defect and achieves the desired result by preventing the transmission of extraneous signals during almost the entire active period of the oscillator.

It will be understood that the invention is not limited in application to the forms of oscillatory synchronizing circuits here shown. The invention is capable of use with all circuits characterized by having an active period, a passive period, and an inchoation period constituting their cycles of operation, in each of which cases the same method is employed, namely, that of preventing transmission of undesired signals by the circuit during the active period. In describing the invention, it will be desirable to speak generally of oscillators of the class above-described and it will be convenient to refer to them by a term which is descriptive of their mode of operation. Fundamentally, they are oscillatory devices which are capable of being synchronized by a pulse signal impressed on their input circuits. Furthermore, they are capable of thus being synchronized during only a fraction of their cycles, such a mode of operation being a consequence of their relaxatory behavior. They may therefore be termed "relaxation synchronizers."

Figure 6:
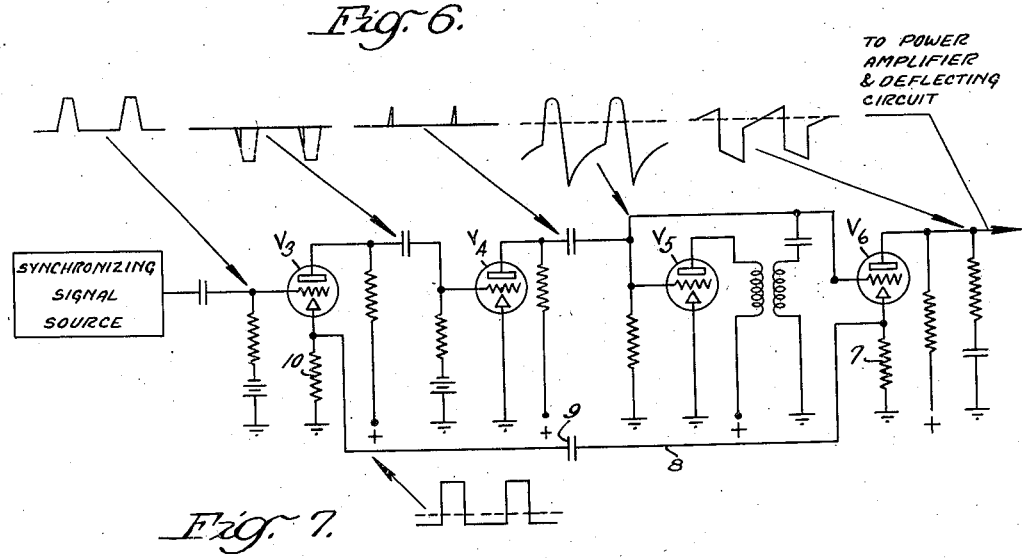
Fig. 6 is a diagrammatic illustration of one form of the invention.

Referring now to Fig. 6, there is illustrated a vertical synchronizing circuit embodying the invention. In this system, $V_3$ is an amplifying tube through which pulses are supplied from a source of synchronizing signal to a second stage including the tube $V_4$ which reverses the phase of the signal which is then fed to the "blocking tube" $V_5$. The latter serves as a "relaxation synchronizer" and generates pulses which are used to actuate the sawtooth deflecting voltage generator which includes the tube $V_6$. In accordance with the present invention, a positive voltage is fed back from a resistor 7 in the cathode lead of the tube $V_6$ through a feedback connection 8 including a condenser 9 to a resistor 10 in the cathode of the tube $V_3$. This voltage serves to make the cathode of $V_3$ more positive with respect to the grid throughout the duration of the active period and thus effectively blocks the tube $V_3$ during this period. In this manner, horizontal pulses and extraneous signals, as well as the latter portion of each synchronizing pulse are prevented from being transmitted. This is clearly shown in the figure where the wave-forms present in various parts of the circuit are indicated. That portion of the signal which is not transmitted by the tube $V_3$ is shown dotted. It will be apparent from the above discussion of Figs. 1 and 2, that the signal pulse formed across resistor 7 is comparable in duration to the active period of the oscillator.

Figure 7:
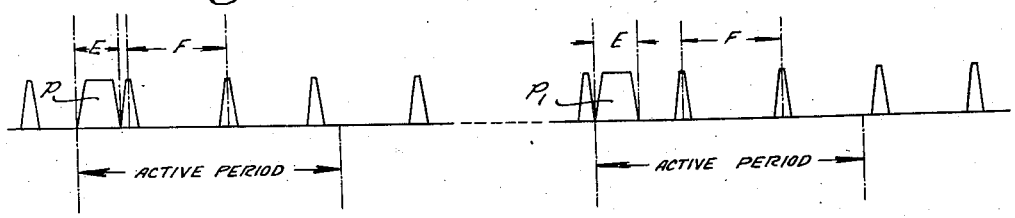

The operation of this system may be clearly understood by considering the illustrations of Figs. 7 and 8. Referring to Fig. 7 which represents a typical television synchronizing signal including both horizontal (short duration) and vertical (longer duration) synchronizing pulses, it will be observed, as has already been mentioned, that the vertical synchronizing pulses do not maintain a constant time displacement from adjacent horizontal pulses. If such a signal is impressed upon a vertical "relaxation synchronizer" with an active period of length corresponding to that shown, the pulse marked P will have three horizontal pulses associated with it while the pulse marked $P_1$ will have only two associated horizontal pulses. In a "relaxation synchronizer" of conventional form, the energy transmitted during the active period corresponding to E will be greater than that transmitted during the period corresponding to F. This will cause variations in the signal transmitted to the deflecting voltage generator, which variations will cause pairing of the lines in the reproduced television picture. The method of the present invention overcomes this defect in the manner illustrated in Fig. 6, i. e., by deriving a voltage from some later portion of the synchronizing circuit, feeding it back to some earlier portion of the circuit, and applying it thereto in such a manner as to prevent all signals of reasonable amplitude from being transmitted to the deflecting voltage generator during the active period of the "relaxation synchronizer," which is commonly referred to by those skilled in the art as "quenching" the tube.

The manner in which the quenching voltage functions to achieve the blocking of a tube in one of the stages prior to the "relaxation synchronizer" is illustrated in Fig. 8. The plate current-grid voltage characteristic of the controlled tube $V_3$ is shown and a series of synchronizing pulses comprising a vertical pulse and several horizontal pulses are shown along a vertical axis passing through the point $a$ to which the tube is biased. The derived voltage which is of sufficient magnitude to bias the tube beyond cut-off during the interval $b$—$b'$ comparable in length to the active period of the "relaxation synchronizer" is applied to the controlled tube so that the signal output of the tube is reduced to zero during the active period, as clearly shown in the diagram. Thus, all signals of reasonable magnitude are prevented from reaching the deflecting voltage generator during the above period. Moreover, undesired signals will be excluded during the passive period by virtue of the property which is inherent to "relaxation synchronizers" and which has hereinbefore been described.

Although positively polarized synchronizing signals are shown in Figs. 6 to 8, the invention may be practised employing negatively polarized synchronizing signals, as shown in Fig. 9. Here again the tube characteristic is shown as well as the synchronizing pulses along a vertical axis through the point $a$ to which the tube is biased. The derived voltage is again applied so as to reduce the signal to zero during the active period. Here, however, the synchronizing pulses exhibit themselves as excursions from the horizontal line through the operating point in the direction of zero plate current. The blanking also constitutes a change in the same direction as the synchronizing signals, but if the blanking intervals are all of equal length, as it is assumed they will be since they correspond to pulses generated by the "relaxation synchronizer" which should be of equal duration, there will be no deleterious effect upon the operation of the synchronizing system.

Viewed in another light this process may be looked upon as supplying a series of pulse signal of either polarity to the grid of the "relaxation synchronizer." These pulses will always be of the same shape and size whether or not there are any extraneous signals applied to the grid and regardless of the nature of these signals, provided, of course, that they are of reasonable amplitude. Hence, the modification in the form of the pulse generated by the "relaxation synchronizer" will be the same for each pulse generated and the deflecting voltage generated will be uniform and periodic and of such a nature as to produce perfectly interlaced scanning in the picture tube of a television receiver.

It will be observed that another method of utilizing the derived signal, if it is of sufficient magnitude, is to cause the signal to drive the tube to saturation during the active period. If done in the same manner during each active period, this will accomplish the desired result, of rendering the tube incapable of passing signals of reasonable amplitude, or of quenching it.

It will be apparent that the quenching voltage may be derived from various places in the synchronizing circuit and may be applied in different manners. Figs. 10 to 13 illustrate various possible embodiments of the invention.

Figure 10:
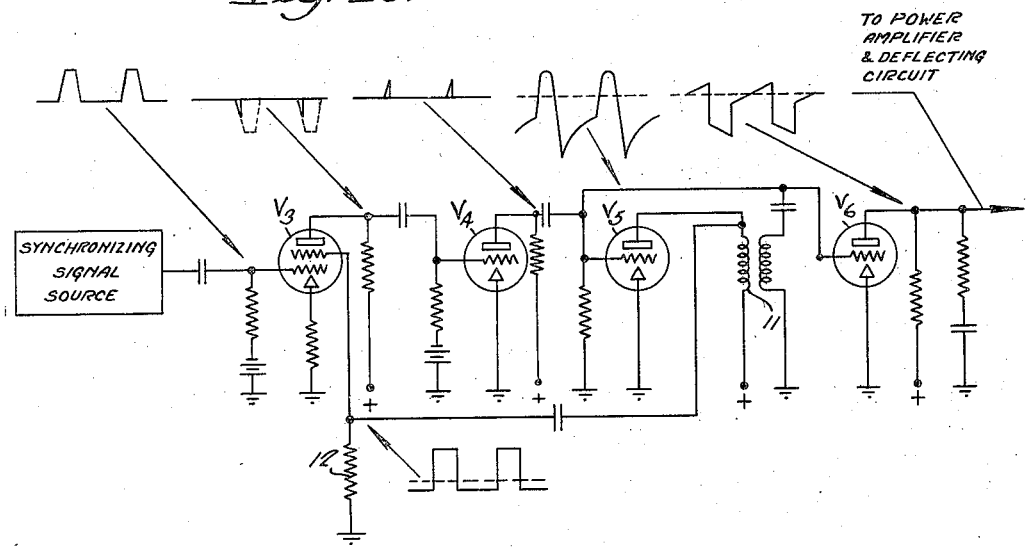

In Fig. 10, there is shown a circuit similar to that of Fig. 6, but modified to the extent that a negative quenching voltage is derived from the plate coil $11$ of the blocking tube oscillator $V_5$ and is fed to the resistor $12$ in suppressor grid lead of the amplifier tube $V_3$ effectively to block that tube during the active period of the blocking tube oscillator. The operation of such circuit will be clearly understood from the foregoing discussion.

Figure 11:
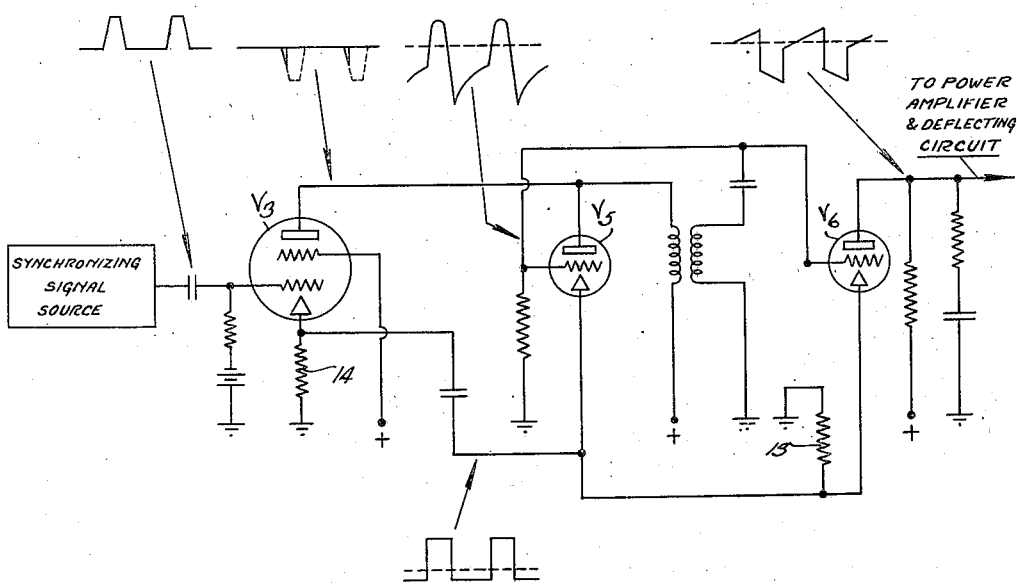

In Fig. 11, there is illustrated a modification wherein the synchronizing pulses are supplied from the tube $V_3$ directly to the plate of the blocking tube $V_5$. A screen grid tube is used for $V_3$ to prevent the drop in the plate voltage of the oscillator tube during its active period from effecting the operation of tube $V_3$. Positive quenching voltage is derived from the resistor $13$ in series with the cathodes of the blocking tube $V_5$ and deflecting voltage generator tube $V_6$, and is fed back to a resistor $14$ in the cathode lead of the amplifier tube $V_3$. Here again the operation will be clearly understood from the foregoing discussion.

Figure 12:
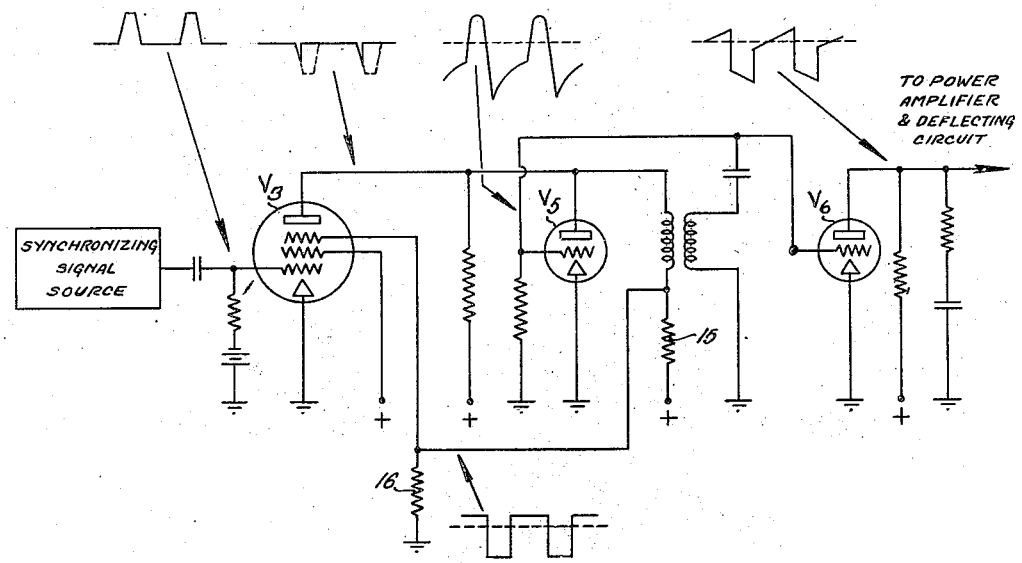

The circuit of Fig. 12 is the same as that of Fig. 11 with the modification that a negative quenching voltage is derived from a resistor $15$ in the plate circuit of the "blocking tube" and is supplied to a resistor $16$ in the suppressor grid lead of the amplifier tube $V_3$.

Figure 13:
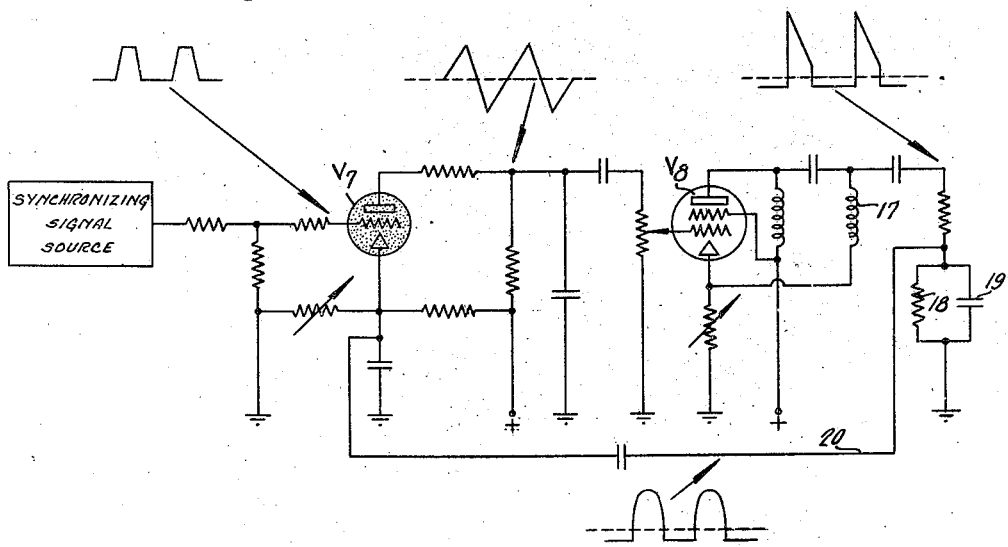

In Fig. 13 there is shown a circuit employing, instead of a blocking tube oscillator, a grid-controlled gas discharge tube according to the method hereinbefore described. As has been mentioned previously, the gas tube $V_7$ also functions as a generator of deflecting voltage which is fed through an amplifying tube $V_8$ to deflecting coil $17$ of the picture tube. The tube $V_8$ is preferably a tube with a high plate resistance in order that the current in the deflecting coil may not be affected by the inherent resistance of the coil. The voltage normally obtained across the deflecting coil is a narrow pulse of considerable magnitude and cannot be used directly to quench the tube $V_7$. Hence it is necessary to insert a time circuit consisting of the resistor $18$ and the condenser $19$ in shunt with the deflecting coil to broaden the impulse so that it will effectively quench the tube $V_7$ during its active period. The voltage across the time circuit is fed back via connection $20$ to the cathode of tube $V_7$ to effect the blocking action above described.

In all of the above described embodiments, positive synchronizing pulses have been indicated as being supplied to the tube which is quenched or blocked. As mentioned above, however, this is not essential. Negative pulses may be supplied to the tube and the quenching applied in any suitable manner, in which case the behavior will differ from that in the case of positive synchronizing pulses, as has heretofore been described, but the quenching will be just as satisfactory.

Furthermore, in all of the above described embodiments separate means have been employed whereby the pulse signals derived from the circuit are fed back so as to modify the operation of a previous stage in order to prevent the transmission of extraneous signals. It is also possible to accomplish this feedback by so arranging the circuit that the desired quenching is accomplished without the use of separate means for feeding back the quenching pulse as employed in all of the embodiments heretofore shown. A circuit for accomplishing this is shown in Fig. 14. It will be observed that negative pulses are supplied to the plate of the blocking tube oscillator $V_5$ by means of the connection 21 from the plate of the tube $V_3$ which, it will be noted, is a triode. During the active period of the blocking tube oscillator when current is flowing in its plate circuit there will be a sudden decrease in the plate voltage of the tube $V_5$. Since the plate of the tube $V_3$ is directly connected thereto by means of the connection 21, the plate voltage of the tube $V_3$ will also drop and, since it is a triode, the result will be to prevent it from transmitting signals of reasonable amplitude during the active period of the blocking tube oscillator. Thus it will be seen that the connection 21 serves a dual purpose. It must be present to transmit the synchronizing pulses from the tube $V_3$ to the blocking tube oscillator, and by properly connecting it as shown in the figure it may also be made to feed-back pulse signals whereby extraneous signals are prevented from reaching the blocking tube oscillator during its active period.

Figure 15:
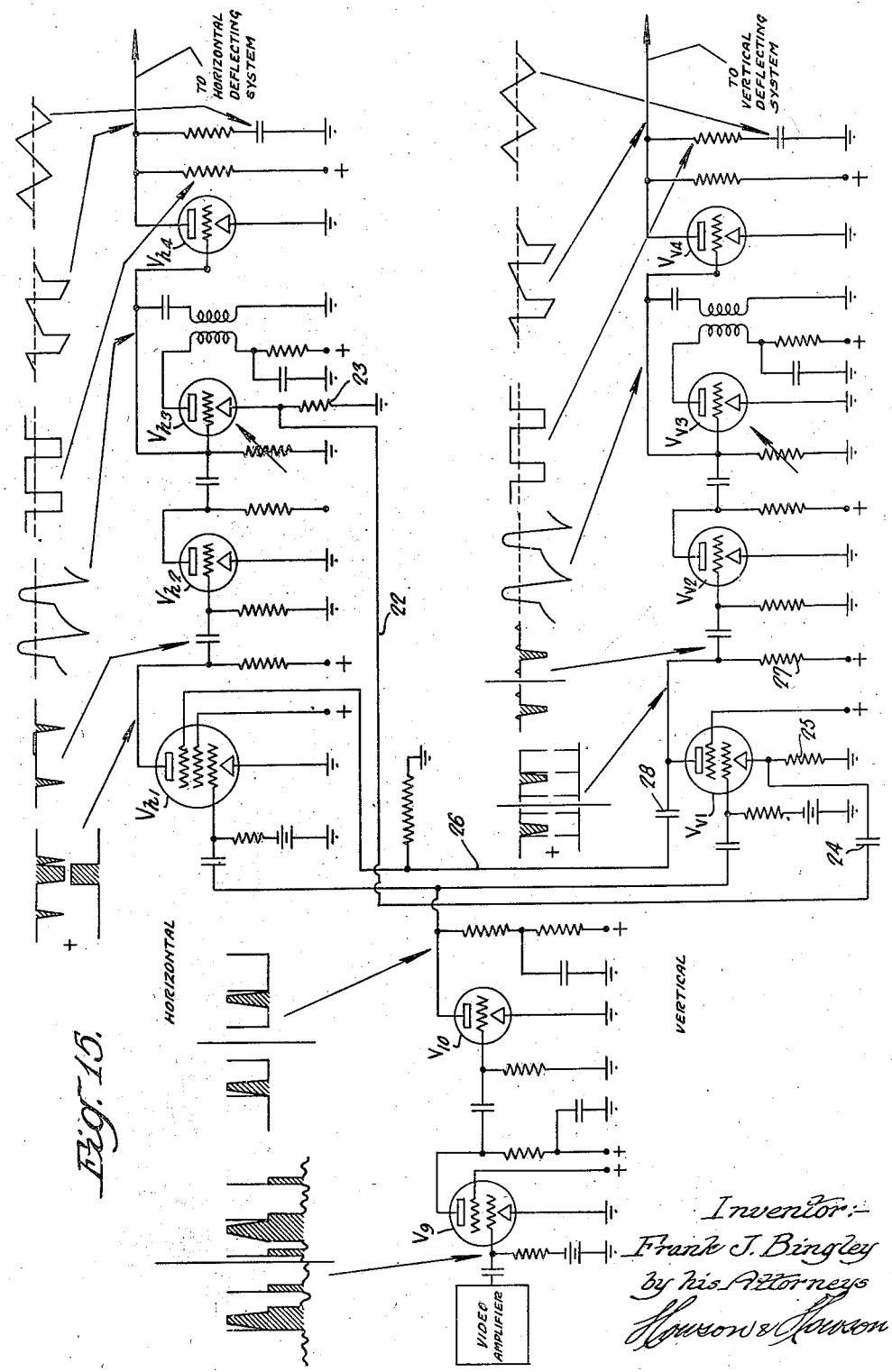

It has already been mentioned that a further object of the invention is to provide a more satisfactory means for separating horizontal and vertical synchronizing pulses than those heretofore used. According to the method of the invention, this involves using a quenching voltage obtained from the horizontal circuit to prevent horizontal synchronizing pulses from entering the vertical circuit, and vice versa. In Fig. 15 there is illustrated a complete television synchronizing system embodying this application of the invention. Synchronizing signals comprising both horizontal and vertical synchronizing pulses are obtained from the composite signal from the video amplifier by amplitude selection in the tube $V_9$ which is so biased as to pass only that portion of the signal in which the synchronizing pulses are contained. The synchronizing signals are further amplified and their phase reversed in the tube $V_{10}$ and are then supplied to the tubes $V_{h1}$ and $V_{v1}$ in the horizontal and vertical synchronizing circuits respectively. It will be noted that both horizontal and vertical synchronizing pulses may be present in the inputs to both circuits. The remainder of both circuits comprise amplifiers $V_{h2}$ and $V_{v2}$ to reverse phase, "blocking tube" oscillators $V_{h3}$ and $V_{v3}$ with their constants adjusted so that one will oscillate with a natural period slightly greater than the horizontal synchronizing frequency and the other with a natural period slightly greater than the vertical synchronizing frequency, and discharge tubes $V_{h4}$ and $V_{v4}$ in the deflecting voltage generators.

Considering first the method by which horizontal pulses are prevented from entering the vertical circuit it will be seen that there is a cross-connection 22 provided between the resistor 23 in the cathode of the oscillator tube $V_{h3}$ in the horizontal circuit, through the coupling condenser 24, to a resistor 25 in the cathode of the first tube $V_{v1}$ in the vertical circuit. In the steady state, pulses will be obtained across the resistor 23 which are of the same frequency and duration as the horizontal synchronizing pulses. Fed to the tube $V_{v1}$, they have the effect of blocking that tube for the duration of each horizontal synchronizing pulse. In the steady state, no vertical pulses are present in the tube $V_{h3}$ and there is no effect upon the operation of tube $V_{v1}$. Thus the tube $V_{v1}$ transmits vertical synchronizing pulses and excludes the horizontal pulses.

Vertical pulses are prevented from entering the horizontal synchronizing circuit in a similar manner. The figure shows a cross connection 26 from the plate resistor 27 of the tube $V_{v1}$ through the coupling condenser 28 to the suppressor grid of the tube $V_{h1}$. The impulses obtained will be of negative polarity and of the same frequency and duration as the vertical synchronizing pulses, so that horizontal pulses will be passed by the tube $V_{h1}$ but vertical pulses will be excluded.

The single embodiment here shown is deemed sufficient to demonstrate the mode of applying the invention to achieve a separation of the horizontal and vertical pulses. However, it is not meant to restrict the invention to this specific embodiment. Any of the sources of quenching voltage shown in Figs. 6 and 10 to 13, or any source which will give the desired pulse, may be used and the quenching may be applied to any point so as to achieve the desired results.

The several specific forms of the invention illustrated and described herein merely serve to disclose the principles of the invention and are not to be considered as limitations thereon, since the invention is capable of physical expression in various other forms and embodiments, such as will occur to persons skilled in the art.

I claim:

1. In a television synchronizing system, a source of time-spaced synchronizing pulses of predetermined frequency, self-oscillatory means operative in response to said synchronizing pulses to form pulse signals, said pulse-forming means having a free period of oscillation different from the period of occurrence of said synchronizing pulses and being characterized in that each operating cycle comprises an active period, a passive period and an inchoation period, signal transfer means connected to said source means for deriving from a formed pulse signal a control signal of duration comparable to the active period of said pulse-forming means. and means for applying said control signal to said transfer means in a manner to prevent transfer of signals thereby during the active period of said pulse-forming means.

2. In a television synchronizing system, a source of time-spaced synchronizing pulses of predetermined frequency. self-oscillatory means operative in response to said synchronizing pulses to form pulse signals, said pulse-forming means having a free period of oscillation different from the period of occurrence of said synchronizing pulses and being characterized in that each operating cycle comprises an active period, a passive period and an inchoation period, signal transfer means interposed between said source and said pulse-forming means, means for deriving from each formed pulse signal a control signal of duration comparable to the active period of said pulse-forming means, and means for applying said control signal to said transfer means in a manner to prevent transfer of signals thereby during the active period of said pulse-forming means.

3. In a television synchronizing system, a source of time-spaced synchronizing pulses of predetermined frequency, self-oscillatory means operative in response to said synchronizing pulses to form pulse signals, said pulse-forming means having a free period of oscillation different from the period of occurrence of said synchronizing pulses and being characterized in that each operating cycle comprises an active period, a passive period and an inchoation period, signal transfer means interposed between said source and said pulse-forming means, means for deriving from said pulse-forming means a control signal of duration comparable to the active period of said pulse-forming means, and means for applying said control signal to said transfer means in a manner to prevent transfer of signals thereby during the active period of said pulse-forming means.

4. In a television synchronizing system, a source of time-spaced synchronizing pulses of predetermined frequency, self-oscillatory means operative in response to said synchronizing pulses to form pulse signals, said pulse-forming means having a free period of oscillation different from the period of occurrence of said synchronizing pulses and being characterized in that each operating cycle comprises an active period, a passive period and an inchoation period, signal utilization means connected to said pulse-forming means, signal transfer means interposed between said source and said pulse-forming means, means for deriving from said utilization means a control signal of duration comparable to the active period of said pulse-forming means, and means for applying said control signal to said transfer means in a manner to prevent transfer of signals thereby during the active period of said pulse-forming means.

5. In a television synchronizing system, a source of time-spaced synchronizing pulses of predetermined frequency, self-oscillatory means operative in response to said synchronizing pulses to form pulse signals, said pulse-forming means having a free period of oscillation different from the period of occurrence of said synchronizing pulses and being characterized in that each operating cycle comprises an active period, a passive period and an inchoation period, signal utilization means associated with said pulse-forming means, signal transfer means interposed between said source and said pulse-forming means, a second signal transfer means interposed between said pulse-forming means and said utilization means, means for deriving from said second transfer means a control signal of duration comparable to the active period of said pulse-forming means, and means for applying said control signal to said first transfer means in a manner to prevent transfer of signals thereby during the active period of said pulse-forming means.

6. In a television synchronizing system, a source of time-spaced synchronizing pulses of predetermined frequency, self-oscillatory means operative in response to said synchronizing pulses to form pulse signals, said pulse-forming means having a free period of oscillation different from the period of occurrence of said synchronizing pulses and being characterized in that each operating cycle comprises an active period, a passive period, and an inchoation period, signal transfer means including space discharge devices interposed between said source and said pulse-forming means, each of said space discharge devices comprising at least an anode, a cathode and a control grid, a deflecting voltage generator including a space discharge device connected to said pulse-forming means and actuated by the pulses therefrom, said last-mentioned space discharge device comprising at least an anode, a cathode and a control grid, a resistor connected to the cathode of said last-mentioned space discharge device, a resistor connected to the cathode of one of the space discharge devices in the said transfer means, and a connection including a serially connected capacitance between the cathodes of the said two last-mentioned space discharge devices.

7. In a television synchronizing system, a source of time-spaced synchronizing pulses of predetermined frequency, self-oscillatory means operative in response to said synchronizing pulses to form pulse signals, said pulse-forming means comprising a space discharge device having at least an anode, a cathode and a control grid, said pulse-forming means having a free period of oscillation different from the period of occurrence of said synchronizing pulses and being characterized in that each operating cycle comprises an active period, a passive period, and an inchoation period, signal transfer means including space discharge devices, at least one of which has a plurality of control elements, interposed between said source and said pulse-forming means, a deflecting voltage generator connected to said pulse-forming means and actuated by pulses therefrom, and a connection including a serially connected capacitance between the anode of the said first-mentioned space discharge device and one of the control elements of the said last-mentioned space discharge device.

8. In a television synchronizing system, a source of time-spaced synchronizing pulses of predetermined frequency, self-oscillatory means, including a space discharge device, operative in response to said synchronizing pulses to form pulse signals, said space discharge device having at least an anode, a cathode and a control grid, said pulse-forming means having a free period of oscillation different from the period of occurrence of said synchronizing pulses and being characterized in that each operating cycle comprises an active period, a passive period, and an inchoation period, signal transfer means including space discharge devices interposed between said source and said pulse-forming means, at least one of said last-mentioned space discharge devices having an anode, a cathode and a control grid, a deflecting voltage generator including a space discharge device connected to said pulse-forming means and actuated by the pulses therefrom, a resistor connected to the cathode of the space discharge devices in said pulse-forming means and in said deflecting voltage generator, a resistor connected to the cathode of one of the space discharge devices in said transfer means, and a connection including a serially connected capacitance between the said resistors.

9. In a television synchronizing system, a source of time-spaced synchronizing pulses of predetermined frequency, self-oscillatory means, including a space discharge device, operative in response to said synchronizing pulses to form pulse signals, said space discharge device having at least an anode, a cathode and a control grid, said pulse-forming means having a free period of oscillation different from the period of occurrence of said synchronizing pulses and being characterized in that each operating cycle comprises an active period, a passive period, and an inchoation period, signal transfer means including space discharge devices, at least one of which has more than one control element, interposed between said source and said pulse-forming means, a deflecting voltage generator connected to said pulse-forming means and actuated by the pulses therefrom, resistive means connected to the anode of the space discharge device in said pulse-forming means for deriving therefrom a control signal, and means including a capacitance for supplying said control signal to one of the control elements of a space discharge device in the said transfer means.

10. In a television synchronizing system, a source of time-spaced synchronizing pulses of predetermined frequency, self-oscillatory grid controlled gas discharge means, operative in response to said synchronizing pulses to form pulse signals, said pulse-forming means having a free period of oscillation different from the period of occurrence of said synchronizing pulses and being characterized in that each operating cycle comprises an active period, a passive period, and an inchoation period, signal utilization means operative in response to said pulse signals, signal transfer means including space discharge devices interposed between said pulse-forming means and said signal utilization means, means for deriving from said transfer means a control voltage of duration comparable to the active period of said pulse-forming means, and means for applying said control signal to said pulse-forming means in a manner to prevent response thereof during its active period.

11. In a television synchronizing system, a source of time-spaced synchronizing pulses of predetermined frequency, self-oscillatory means operative in response to said synchronizing pulses to form pulse signals, said pulse-forming means including a space discharge device having a plurality of electrodes, said pulse-forming means having a free period of oscillation different from the period of occurrence of said synchronizing pulses and being characterized in that each operating cycle comprises an active period, a passive period, and an inchoation period, signal transfer means interposed between said source and said pulse-forming means, said transfer means including space discharge devices of which that space discharge device immediately preceding the said pulse-forming means has but three elements, namely an anode, a cathode and a control grid and a connection between the anode of said last-mentioned space discharge device and one of the elements of said space discharge device in the pulse-forming means, whereby the synchronizing pulses are supplied to said pulse-forming means and a control voltage is derived from the pulse-forming means and is supplied to the transfer means in a manner to prevent transfer of signals thereby during the active period of said pulse-forming means.

12. In a television system having a horizontal synchronizing circuit and a vertical synchronizing circuit, the method of preventing one synchronizing signal from traversing the synchronizing circuit for the other signal, which consists in deriving a control signal from the circuit for one of said signals, and utilizing said control signal to control the transmission of signals by the synchronizing circuit for the other of said signals.

13. In a television scanning system, a source of horizontal and vertical synchronizing signals, a horizontal synchronizing circuit connected to said source, a vertical synchronizing circuit connected to said source, means in one of said synchronizing circuits for preventing the transfer of one of said signals, means for supplying the signal transferred by said circuit to the other synchronizing circuit so as to oppose in that circuit the signal transmitted by said one circuit.

14. In a television scanning system, a source of horizontal and vertical synchronizing signals, a horizontal synchronizing circuit connected to said source, a vertical synchronizing circuit connected to said source, self-oscillatory means in one of said synchronizing circuits operative in response to one of said synchronizing signals to form pulse signals, said pulse-forming means having a free period of oscillation different from the period of occurrence of said one synchronizing signal and being characterized in that each operating cycle comprises an active period, a passive period and an inchoation period, and means for supplying the signal generated by said pulse-forming means to the other of said synchronizing circuits so as to oppose in that circuit the signal to which said one synchronizing circuit is responsive.

15. In a television scanning system, a source of horizontal and vertical synchronizing pulses, signal transfer means connected to said source for transferring the horizontal synchronizing signals, signal transfer means connected to said source for transferring the vertical synchronizing signals, self-oscillatory means connected to one of said signal transfer means and operative in response to one of said synchronizing signals to form pulse signals, said pulse-forming means having a free period of oscillation different from the period of occurrence of said one synchronizing signal and being characterized in that each operating cycle comprises an active period, a passive period, and an inchoation period, means for deriving from each formed pulse signal a control signal of duration comparable to the active period of said pulse-forming means, and means for applying said control signal to the transfer means for the other of said synchronizing signals in a manner to prevent transfer of signals thereby during the active period of said pulse-forming means.

16. In a television scanning system, a source of horizontal and vertical synchronizing pulses, self-oscillatory means operative in response to said horizontal synchronizing pulses to form pulse signals, self-oscillatory means operative in response to said vertical synchronizing pulses to form pulse signals, each of said pulse-forming means having a free period of oscillation different from the period of occurrence of said synchronizing pulses and being characterized in that each operating cycle comprises an active period, a passive period, and an inchoation period, signal transfer means interposed between said source and said horizontal pulse-forming means, signal transfer means interposed between said source and said vertical pulse-forming means, means for deriving from each formed pulse signal generated by one of the pulse-forming means a control signal of duration comparable to the active period of the pulse-forming means, and means for applying said control signal to the transfer means for the other pulse-forming means in a manner to prevent transfer of signals thereby during the active period of the pulse-forming means from which the control signal is derived.

17. In a television scanning system, a source of horizontal and vertical synchronizing pulses, self-oscillatory means operative in response to said horizontal synchronizing pulses to form pulse signals, self-oscillatory means operative in response to said vertical synchronizing pulses to form pulse signals, each of said pulse-forming means having a free period of oscillation different from the period of occurrence of said synchronizing pulses and being characterized in that each operating cycle comprises an active period, a passive period, and an inchoation period, signal utilization means connected to said horizontal pulse-forming means, signal utilization means connected to said vertical pulse-forming means, signal transfer means interposed between said source and said horizontal pulse-forming means, signal transfer means interposed between said source and said vertical pulse-forming means, means for deriving from one of said utilization means a control signal of duration comparable to the active period of the pulse-forming means associated therewith, and means for applying said control signal to the transfer means associated with the other pulse-forming means in a manner to prevent the transfer of signals thereby during the active period of the pulse-forming means from which the control signal is derived.

18. In a television scanning system, a source of horizontal and vertical synchronizing pulses, self-oscillatory means operative in response to said horizontal synchronizing pulses to form pulse signals, self-oscillatory means operative in response to said vertical synchronizing pulses to form pulse signals, each of said pulse-forming means having a free period of oscillation different from the period of occurrence of said synchronizing pulses and being characterized in that each operating cycle comprises an active period, a passive period, and an inchoation period, signal utilization associated with each of said pulse-forming means, signal transfer means interposed between said source and each of said pulse-forming means, other signal transfer means interposed between each pulse-forming means and its associated utilization means, means for deriving from one of said second mentioned transfer means a control signal of duration comparable to the active period of the pulse-forming means associated therewith, and means for applying said control signal to the transfer means associated with the source and the other pulse-forming means in a manner to prevent the transfer of signals thereby during the active period of the pulse-forming means from which the control signal is derived.

19. In a television synchronizing system, a source of horizontal and vertical synchronizing pulse signals each of predetermined frequency, a horizontal synchronizing circuit connected to said source, a vertical synchronizing circuit connected to said source, means in said horizontal synchronizing circuit operative in response to horizontal synchronizing pulses to form pulse signals, means in said vertical synchronizing circuit operative in response to vertical synchronizing pulses to form pulse signals, each of said pulse-forming means being characterized by having an active period, a passive period and an inchoation period during each operating cycle, signal transfer means in said horizontal synchronizing circuit interposed between said source and said first pulse-forming means, signal transfer means in said vertical synchronizing circuit interposed between said source and said second pulse-forming means, means for deriving from each formed pulse in said horizontal synchronizing circuit a control signal of predetermined magnitude and of duration comparable to the active period of said first pulse-forming means, means for applying said control signal to said second transfer means in a manner to prevent transfer of signals in said vertical synchronizing circuit, means for deriving from each formed pulse in said vertical synchronizing circuit a control signal of predetermined amplitude and of duration comparable to the active period of said second pulse-forming means, and means for applying said second control signal to said first transfer means in a manner to prevent transfer of signals in said horizontal synchronizing circuit, whereby said horizontal and vertical synchronizing signals are effectively separated and are confined to their respective circuits.

20. In a television system having a horizontal and a vertical synchronizing circuit supplied with horizontal and vertical synchronizing signals from a common source, said signals comprising a plurality of time-spaced synchronizing pulses, the pulses comprising said horizontal signal being non-contemporaneous with respect to those comprising said vertical signal, the method of preventing one synchronizing signal from traversing the synchronizing circuit adapted to respond to the other synchronizing signal, which consists in deriving from the synchronizing circuit adapted to respond to said one signal a control signal timed by the pulses of said one signal, and utilizing said control signal to control the transmission of signals in the synchronizing circuit for said other signal.

21. In a television system, a common source of horizontal and vertical synchronizing signals, said signals comprising a plurality of time-spaced synchronizing pulses, the pulses comprising said horizontal signal being non-contemporaneous with respect to those comprising said vertical signal, a synchronizing circuit adapted to respond to said horizontal pulses connected to said source, a circuit adapted to respond to said vertical pulses connected to said source, means in one of said circuits for preventing the transfer of one of said signals, and means for applying the signal transferred by said one circuit to the other circuit so as to oppose in that circuit the signal transmitted by said one circuit.

22. In a television scanning system, a common source of horizontal and vertical synchronizing signals, said signals comprising a plurality of time-spaced synchronizing pulses, the pulses comprising said horizontal signal being non-contemporaneous with respect to those comprising said vertical signal, a synchronizing circuit adapted to respond to said horizontal pulses connected to said source, a circuit adapted to respond to said vertical pulses connected to said source, each of said circuits including space discharge devices, means for deriving from one of said circuits a control signal timed by the pulses of said signal to which said circuit is adapted to respond, and means for applying said control signal to said other circuit to prevent the transfer of the corresponding signal in said other circuit.

FRANK J. BINGLEY.